Feb. 14, 1967     S. H. MINNICH ET AL     3,304,466
PROTECTIVE CIRCUITS FOR SUPERCONDUCTIVE LOADS
Filed April 20, 1965     3 Sheets-Sheet 1
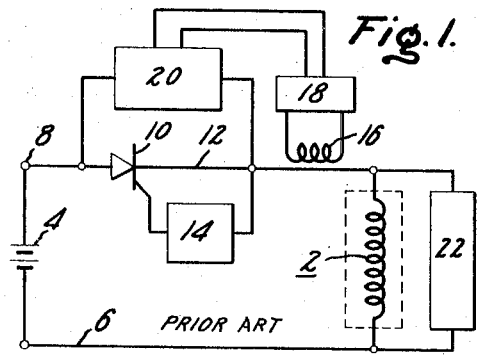
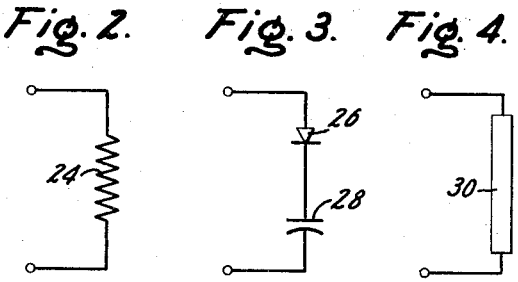
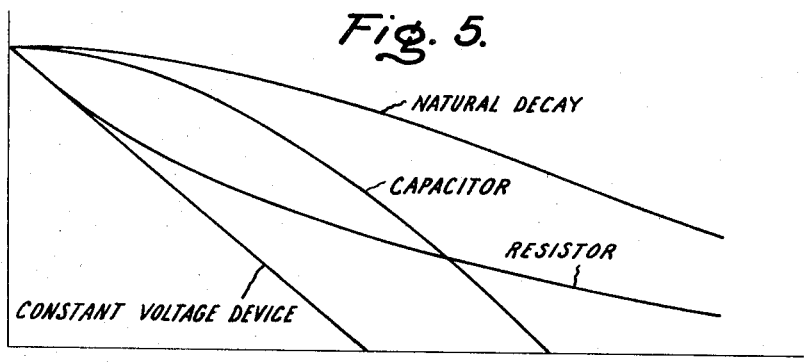
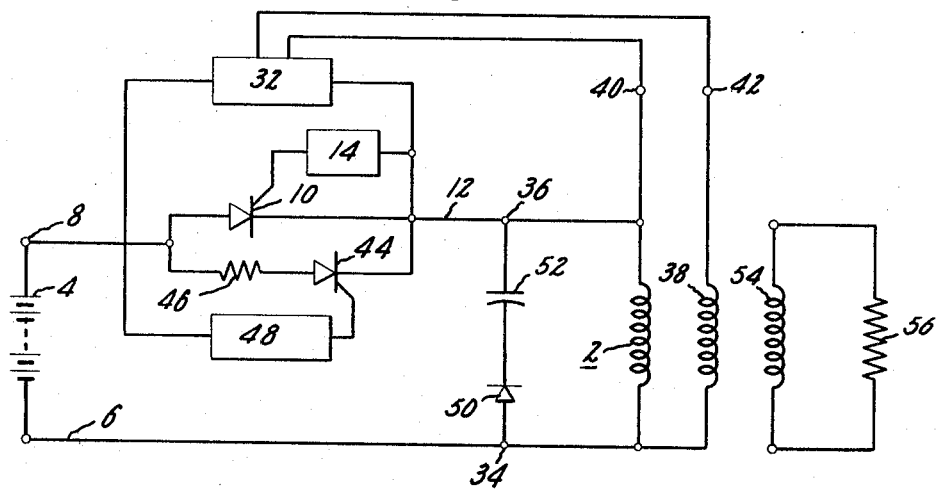
Inventors:
Stephen H. Minnich,
Theodor A. Buchhold,
by Charles W. Helzer
Their Attorney.

Inventors:
Stephen H. Minnich,
Theodor A. Buchhold.
by Charles W. Helzer
Their Attorney.

United States Patent Office 3,304,466
Patented Feb. 14, 1967

3,304,466
PROTECTIVE CIRCUITS FOR SUPERCONDUCTIVE LOADS
Stephen H. Minnich and Theodor A. Buchhold, Schenectady, N.Y., assignors to General Electric Company, a corporation of New York
Filed Apr. 20, 1965, Ser. No. 449,526
20 Claims. (Cl. 317—13)

This invention generally relates to protective circuits for superconductive loads. More particularly, it is directed toward protective circuits for superconductive coils.

In the discussion which follows, the term "superconductive" refers to materials or elements which can exhibit two levels of resistance. Under standard conditions a normal resistance exists; but if the material or element is subjected to an extremely low temperature, its resistance decreases to a substantially-zero value. The term "superconducting" refers to this level of substantially-zero resistance. Therefore, the superconductive material or element has two possible operating modes: the normal or resistive mode; and the superconducting mode which exhibits substantially-zero resistance.

Protective devices are available which sense a current decrease in a superconducting coil and de-energize the coil. These protective devices normally comprise a means to sense the magnetic field about the superconductive coil so that a change in the magnetic field produces a signal in a sensing means. This signal is used to simultaneously initiate de-energization of the superconductive coil and initiate switching of an energy dissipation circuit into series with the superconductive coil. Certain of these protective devices have been described in copending U.S. patent application Ser. No. 437,726, filed March 8, 1965, entitled "Fast Acting Protective Circuits for Superconducting Coils," D. L. Watrous and S. H. Minnich, inventors, assigned to the General Electric Company.

Magnetic energy stored in a superconducting coil is or can be for a large coil, a very large quantity. If the magnetic energy were allowed to dissipate in the superconductive coil, the magnetic energy would be converted to heat in the portion of the superconductive coil which had changed to the normal mode. Dissipation of this quantity of heat locally in the superconductive coil would undoubtedly damage the coil. In the above-mentioned prior art devices, dissipation circuits are provided to form a path for current when the magnetic field collapses during de-energization. The magnetic energy is thereby dissipated in the energy dissipation circuit as heat, but externally to the superconductive coil so that damage is minimized. Another feature of such a dissipation circuit is the short time period required for the current to reach a zero value in comparison with the normal decay period for the superconductive coil.

It is possible that the portion of the superconductive coil which became normal reverts to the superconducting state immediately upon de-energization. However, in the prior art protective devices, all the magnetic energy is converted and dissipated. If the energy of the superconductive coil could be transferred to a storage coil temporarily, for a period long enough to allow the superconductive coil to again become superconducting, and then be transferred back into the superconductive coil prior to complete dissipation of the magnetic energy, then the entire quantity of magnetic energy would not be wasted.

Accordingly, it is an object of this invention to provide a circuit which interrupts current flow to a superconductive winding upon sensing a tendency for the superconducting coil to go normal, and quickly transfers magnetic energy stored therein to an ancillary storage winding and subsequently returns the energy to the superconductive winding after the winding has returned to its superconducting mode.

Another object of this invention is to provide a protective circuit which allows the current through a superconducting winding, after interruption in the above fashion, to be reduced to zero so that recovery of the superconducting mode is facilitated, and accomplishes this in the shortest possible time so as to allow re-energization of the superconducting winding prior to any substantial dissipation of the energy of the winding.

Some of the prior art protective devices use a mutual inductance to sense changes in the magnetic field surrounding the superconductive coil. Such field changes can be produced by current decreases or by "flux jumps." A "flux jump" is said to occur when diamagnetic shielding currents in a hard superconductor are suddenly destroyed, allowing sudden penetration of magnetic flux into the superconductive coil. As wire in a superconductive coil carries both a transport current and diamagnetic shielding currents, a flux jump causes small regions of the wire to be suddenly penetrated by additional flux lines due to the interruption of the shielding currents. This penetration causes a sudden change in the coil inductance which necessitates a transient decrease in current. The mutual inductance sensor senses changes in the current caused by flux jumps as well as changes caused by the coil going normal and cannot discriminate between them. Many times the flux jump does cause a transition to a normal state in a portion of the superconductive coil wherein the flux jump occurs and deenergization is required. On other occasions, a flux jump does not cause transition to the normal state, and deenergization of the superconductive coil is not necessary.

Accordingly, it is another object of this invention to provide improved sensing circuits for use in protective arrangements for superconducting coils which can discriminate between transitions to a normal state and flux jumps.

Briefly stated, this invention presents a protective circuit wherein a first switching device is disposed in series with the superconductive load. A switch operator is provided to terminate conduction through the first switching device, thereby interrupting current flow to the load. Subsequent to interruption, the magnetic field is sustained by an induced current in an ancillary storage coil closely coupled to the superconductive load, and to which energy stored in the load is temporarily transferred. The switch operator is actuated by a sensing circuit which is sensitive to current decreases caused by transitions to normal, but it is intensitive to a current decrease caused by flux jumps (or other causes of magnetic field change). A second switching device, having a slightly greater impedance than the first switching device, is connected to form a shunt path about the first switching device. A switch operator for this second switching device includes a time-delay circuit which is initiated when the first switching device is turned off. The time-delay set into the circuit causes the second switching device to close subsequent to the termination of conduction through the first switching device. Current flow through the superconducting coil is thereby automatically re-established after a predetermined time delay, and the energy being temporarily stored in the ancillary storage winding is transferred back to the superconducting coils. This predetermined time delay is intended to allow for the transition to normal to be arrested, and for the coil to return to its superconducting condition. Upon current flow to the coil being re-established, a major portion of the energy stored in the coil will be conserved.

Another feature of the invention is the provision of a circuit branch which allows the current through the superconducting winding, subsequent to interruption in the above-described manner, to be quickly reduced to zero value thereby assuring that the winding can be returned to its superconducting mode of operation as rapidly as possible. This circuit branch is designed in such a manner that the reduction of current through the coil to a zero value is accomplished in the shortest possible time so as to allow the winding to be returned to its superconducting mode and current flow re-established through the superconducting winding prior to any substantial dissipation of the energy originally stored in the superconducting winding.

Still another feature of the invention is the provision of an improved sensing winding which senses resistance in the superconductive winding caused by transitions to normal, but which is relatively insensitive to flux jumps thereby assuring that the protective circuit causes interruption of current flow to the superconducting winding only when a portion of the superconducting winding actually goes normal.

The above and still further features, objects and advantages of this invention will become apparent upon consideration of the following detailed description of a specific embodiment thereof, especially taken in conjunction with the accompanying drawings.

FIGURE 1 illustrates in diagrammatic form a presently available (prior art) protective device which can be used to completely de-energize a superconductive coil;

FIGURES 2, 3 and 4 illustrate embodiments of various energy dissipation circuits which can be used with the protective device of FIGURE 1;

Figure 7:
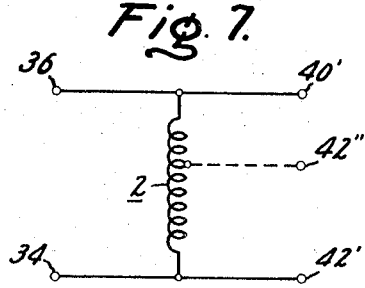
Figure 8:
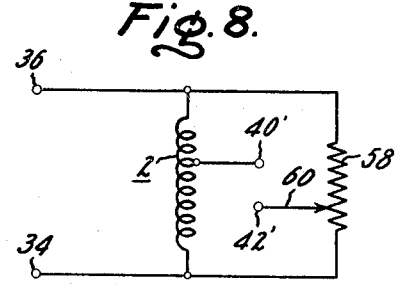
Figure 9:
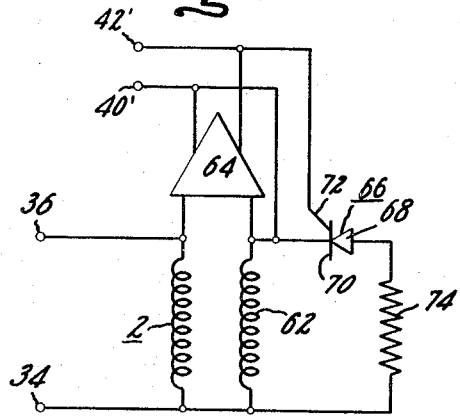
Figure 10:
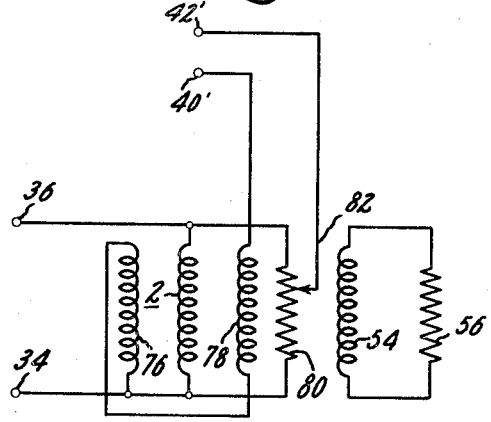
Figure 10A:
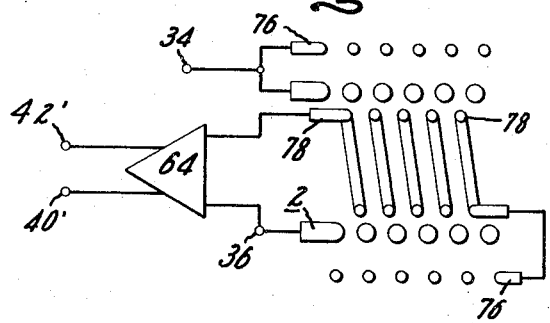
Figure 11:
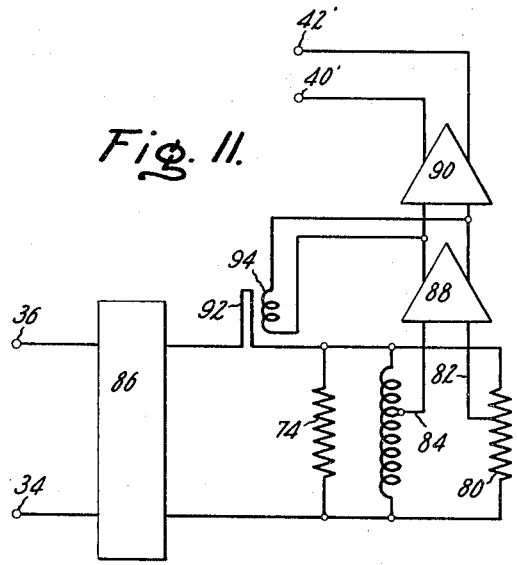
Figure 12:
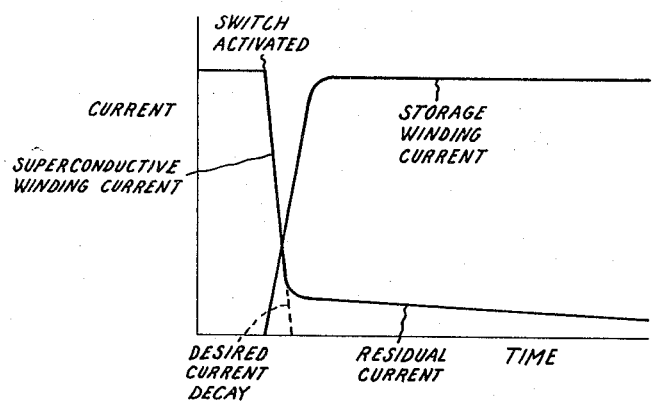

FIGURE 5 presents a graphical analysis of current decay encountered with the various dissipation circuits, shown in FIGURES 2 through 4;

FIGURE 6 illustrates one embodiment of the protective circuit which forms this invention;

FIGURES 7 and 8 illustrate alternative embodiments of sensing circuits which can be substituted in the protective circuit shown in FIGURE 6;

FIGURE 9 illustrates a sensing circuit and energy transfer circuit which can be substituted in the protective circuit shown in FIGURE 6;

FIGURE 10 illustrates another sensing and energy transfer circuit which can be substituted in the protective circuit shown in FIGURE 6, and FIGURE 10a reveals the physical structure of the superconductive coil and the sensing circuit;

FIGURE 11 illustrates still another sensing and energy transfer circuit which can be substituted in the protective circuit shown in FIGURE 6; and FIGURE 12 is a graphical analysis of the current values taking place in the superconductive winding and ancillary storage coil during operation of the protective circuit.

Throughout this application like elements are designated by like reference numbers for convenience and for clarity of understanding.

Referring to FIGURE 1, a prior art protective device is shown in diagrammatic form to illustrate generally a protective device which has been used to completely de-energize a superconductive load as described more fully in the above-identified copending application of Watrous and Minnich. More particularly, the superconductive load comprises a superconductive coil 2 which is energized by a low-voltage high-current D.C. power supply 4. Connection between the superconductive coil 2 and the D.C. power supply 4 is provided through a controlling device which may take the form of a load silicon controlled rectifier (SCR) 10. A SCR gate circuit 14 is connected between the gate and cathode of the load SCR 10, and initiates conduction through the load SCR 10. A mutual inductance 16, disposed close to the superconductive coil 2, senses any current change and controls a trigger circuit 18, which can comprise a trigger relaxation oscillator or any other circuit known in the art. The trigger circuit 18 is coupled to and causes actuation of a commutating circuit 20 which is connected between the anode and cathode of the load SCR 10 to terminate conduction therethrough. To absorb the magnetic energy stored in the superconductive coil 2 when it is de-energized, an energy dissipation circuit 22 is placed in parallel with the superconductive coil 2. The energy dissipation circuit may comprise a resistor as shown in FIGURE 2, a capacitor as shown in FIGURE 3, or a Thyrite resistor as shown in FIGURE 4, or other devices described in the above referred-to previous application.

Briefly, the operation of this type of protective circuit is initiated by energizing the SCR gate circuit 14 when the superconductive coil 2 is in a superconducting state; current flows through the superconductive coil 2. If the current decreases, the mutual inductance 16 senses a magnetic field change and energizes the trigger circuit 18 thereby firing the commutating circuit 20 to turn off the load SCR 10. When the load SCR 10 is turned off, the superconductive coil 2 dissipates all the magnetic energy stored therein into the energy dissipation circuit 22.

FIGURE 5 illustrates the decay times for the superconducting coil using the various energy dissipation elements shown in FIGURES 2–4 with curve A representing the natural decay rate for the superconductive coil if no energy dissipation means 22 were present. Curve B reveals the decay curve for a circuit as shown in FIGURE 1 wherein the energy dissipation circuit comprises a resistor as shown in FIGURE 2. Curve C represents the circuit in FIGURE 1 utilizing the capacitive energy dissipation circuit as shown in FIGURE 3 while curve D illustrates the current decay for a constant voltage device as shown in FIGURE 4. It is noted that the constant voltage device provides the most rapid decay time for a given maximum voltage, and also that it provides a linear decay as opposed to the other types of energy dissipation circuits.

One embodiment of an improved protective circuit in accordance with the present invention and which accomplishes all the objects as set forth above, is shown in FIGURE 6. A superconductive coil 2 is energized by a first, low-voltage high-current, D.C. power supply 4. A lead 6 directly connects the negative side of the first D.C. power supply 4 to a first load terminal 34 of superconductive coil 2. The positive side of the D.C. power supply is connected through a first load current switching means 10 to the remaining terminal 36 of superconductive coil 2. The first load current switching means 10 comprises a power semiconductor preferably a silicon controlled rectifier, or a triac, a diac, or it may comprise some other fast acting electronic switching means such as a thyratron or three-electrode gap. A sensing coil 38 which preferably is formed of the same number of turns and bifilar wound in the same direction as the superconductive coil 2, is placed in an inductive relationship with the superconductive coil 2. A sensing circuit output is constituted by a first sensing output terminal 40, connected to the second load terminal 36, and a second sensing output terminal 42, connected to the first load terminal 34 through the sensing coil 38. Input leads from a trigger and commutating circuit 32 are connected to the output from the sensing circuit through terminals 40 and 42.

In the embodiment of the invention shown in FIGURE 6, a second load power switching means 44 comprised by a power semiconductor such as a SCR and a load resistor 46 in series are connected in parallel with the first load SCR 10. The second load SCR 44 is turned on by a time-delay and gating circuit 48 which comprises a time-delay network. The input to the time-delay and firing circuit 48 is connected to an output on the commutating circuit 32. Although the time-delay and firing circuit 48 is energized simultaneously with the commutating circuit 32, the second load SCR is not turned on until after a predetermined time period has elapsed. This time period is manually set into the time-delay and firing circuit 48 and is generally determined by the time required for any transition to normal in coil 2 to be arrested, and the coil to be returned to a superconducting condition.

A feature of the protective circuit shown in FIGURE 5 is the provision of an energy transfer circuit comprised by a temporary storage winding 54 including its internal resistance 56 connected in a closed series circuit loop for temporarily storing the energy of the superconducting coil with minimum loss during the above-mentioned interval of time required for the coil to return to a superconducting condition. To minimize this time period, constant voltage circuit means are provided for driving the current through superconducting coil 2 to zero value in minimum time. This constant voltage circuit means comprises a diode 50 and a pre-charged capacitor 52 connected in series between the first and second terminals 34 and 36 with the negative terminal of the supply 52 connected to the second load terminal 36 and the anode of the diode 50 connected to the first load terminal 34. The precharged capacitor 52 also serves as an energy dissipation means for dissipating leakage energy from the superconducting coil 2 as will be explained more fully hereinafter.

The superconductive coil 2 is energized by closing the SCR gate circuit 14 to energize the first load SCR 10 when the superconductive coil 2 is in the superconducting state. If a flux jump occurs, it affects both the superconductive coil 2 and the sensing coil 38. As these coils are wound bifilar and connected in an opposing manner, the voltage variations across the superconductive coil 2 and sensing winding 38 are identical and cancel each other out so that no net signal voltage appears between terminals 40 and 42. Therefore, the first load SCR 10 remains in a conducting state. If a portion of the superconductive coil 2 goes normal, the resultant resistive voltage drop does not appear in the sensing coil 38, so the only voltage variation is due to a change in resistance that occurs in the superconductive coil 2. The voltage which appears in the circuit comprising the superconductive coil and the sense winding is, thus, due to the voltage drop across the resistance in the superconductive coil, only, and contains no unwanted components due to changes in the flux linking the winding. This resistive voltage is produced between the sensing output terminals 40 and 42 and the commutating circuit 32 is energized. This causes the first load SCR 10 to be commutated off.

Upon SCR 10 being commutated off, two things happen substantially concurrently. First, the energy stored in the superconductive coil 2 begins to transfer to the energy storage winding comprising the storage coil 54 and its internal resistance 56 (if any). Note that for proper operation, the internal resistance 56 must be as low as possible. This can be accomplished with good conductors such as copper or aluminum, and does not preclude the use of a superconductor. The voltage on the capacitor 52 and the diode 50 tend to drive the current in the superconductive coil 2 in a negative direction, and the secondary current in the ancillary storage coil 54 rises to maintain constant flux linkages. The circuit therefore permits the current to be driven directly to zero in a time period comparable to those time periods that would be required if the circuit contained a constant resistance device. The combination of the energy transfer circuit and the constant voltage source therefore tends to provide a rapid linear decrease of the current of the superconductive coil 2.

The second thing that happens upon SCR 10 being commutated off, simultaneously with the start of energy transfer, is that a start signal from the commutation circuit 32 is supplied to the time-delay and firing circuit 48. After an empirical time-delay, set into the time-delay and firing circuit 48, the second load SCR is fired. When this occurs, the total circuit resistance increases slightly by the addition of the load resistor 46 in series with the second load SCR 44. However, the circuit is re-established through superconducting coil 2, and the energy temporarily being stored in storage coil 54 is returned to the superconducting coil due to the higher resistance of the storage circuit. Assuming, then, that coil 2 has reverted to the superconducting state, the superconductive coil remains energized at this reduced current flow. However, if the normal portion of the coil is maintained or if another portion of the superconductive coil goes normal, a signal appears at the sensing output terminals 40 and 42; and the commutating circuit 32 fires causing the second load SCR 44 to be commutated off thereby initiating a new cycle of operation in the above manner.

From a consideration of the above description, it can be appreciated that the invention makes available a protective circuit having an improved sensing arrangement wherein the sensing coil 38 in conjunction with the superconductive coil 2, provides a signal at the sensing output terminals 40 and 42 to energize the commutating circuit 32 only when a portion of the superconductive coil goes to the normal state. As these coils are affected by the same magnetic field, a flux jump causes no voltage to appear between the two sensing output terminals 40 and 42, and false triggering of the protective circuit is avoided. In addition, the use of the second load SCR 44, the load resistor 46 and the time-delay and firing circuit 48 provide a means to re-energize the superconductive coil 2 at a lower current on those occasions when the protective circuit is properly triggered on. This provides a means to quickly re-energize the coil after the coil returns to the superconducting state and results in a minimum loss of energy. The circuit of FIGURE 6 shows the use of a pre-charged capacitor connected across the superconducting winding. The purpose of this capacitor is to maintain a constant voltage across the winding in such direction so as to oppose the flow of current through the superconductive winding and reduce it to zero. The presence of a diode in series with the capacitor prevents reversal of the current in the superconductive winding after it goes through zero. As the current in the superconductive winding decreases the current in the storage winding increases in order to maintain constant flux linkages as required by the laws of induction. Since in practice, the two windings cannot (or may not) have identical flux linkages, a portion of the energy which was stored in the superconductive winding represented by flux which is not commonly linked by the ancillary storage winding, cannot be transferred to the storage winding. This energy in the "leakage" inductance of the superconductive winding must be absorbed by the capacitor 52. In this sense the capacitor acts as an energy dissipation circuit as described in the prior art circuit above. Other energy dissipation circuits could be used as described in the prior art invention, such as a resistor, Thyrite, a battery, etc. As in the case of the prior art circuit, the design of the energy dissipation circuit limits the voltage across the coil and across the load SCR to a safe value. As in that case, most effective use of that safe level voltage is made if it is maintained constant at all times during the cycle. Another important feature of the energy dissipation circuit for the present protective circuit which is not immediately obvious is that it should reduce the current through superconductive winding to exactly zero in the shortest possible time. This feature can be illustrated by reference to the characteristic of the current decay if a resistor were to be used for the energy dissipation circuit. In that case, the current decay through the winding and the resistor would be as shown in FIGURE 12. It is seen that the current immediately drops to a low value (the rise in current in the ancillary storage winding is also shown for reference), and then decays slowly according to an exponential relationship. The level of the residual current could be adjusted to a low value by adjustment of the resistance in the energy dissipation circuit, but it cannot be removed entirely. In contrast, if a constant voltage element such as a precharged capacitor or battery is used in the energy dissipation circuit, the current is driven to exactly zero as is also shown in FIGURE 12. Any residual current interacting with the normal state resistance appearing in the superconductive winding would produce heat which would delay or prevent reversion to the superconductive state. Provision of circuits which reduce the current to a zero value provide optimum conditions for restoration of superconductivity. Combination circuits which include a capacitor in series with a resistor or in series with a Thyrite element could be employed when the "leakage" energy is so large as to make the use of a pre-charged capacitor alone impractical. In such a circuit, the greater part of the "leakage" energy would be absorbed in the resistor or Thyrite element, and the presence of the series capacitor assures that the current goes to zero in a finite time. Decay times and voltages can be adjusted by choice of proper values for the resistive and capacitive elements.

An alternate sensing device is shown in FIGURE 7 wherein the separate sensing coil 38 of the sensing circuit arrangement employed in FIGURE 6 is eliminated. This particular sensing circuit is connected to the first and second load terminals 36 and comprises the superconductive coil 2 and sensing output terminals 40' and 42' which are connected directly across the superconductive coil 2. However, a voltage drop caused by the appearance of a resistive portion in the superconductive coil is somewhat balanced by the induced voltages in other portions of the superconductive coil 2; and this circuit does tend to be insensitive. An optional sensing output terminal 42" is also shown. By using this terminal only a portion of the coil inductive voltage is measured, and cancellation of the resistive voltage by inductive voltage is reduced.

Referring to FIGURE 8, a high-resistance voltage divider 58 with a tap 60 is placed in parallel with the superconductive coil 2. This is an alternative sensing circuit to that shown in FIGURE 7 and is somewhat more sensitive to the appearance of a normal portion in the super-conductive coil. A first sensing output terminal 40' is formed by a tap from the superconductive coil 2 while the second sensing output terminal 42' is formed by the voltage divider tap 60. The voltage divider tap 60 is set so that the voltage divider 58 balances inductive voltages caused by flux jumps in the superconductive coil 2. If a portion of the superconductive coil starts to go to a normal resistance, a resistive voltage appears between the sensing output terminals 40' and 42'.

Referring to FIGURE 9, a sensing circuit, as shown in FIGURE 6, is combined with an energy transfer circuit which does not require a separate sensing winding. A bifilar storage winding 62 and a sensing amplifier 64 are connected to the superconductive coil 2 to provide a sensing circuit which operates similarly to the sensing circuit shown in FIGURE 6. The input signal to the amplifier 64 is constituted by resistive voltage in the superconductive coil 2. As the bifilar storage winding 62 is wound so as to have the same number of turns and so as to be wound in the same direction as the superconductive coil 2, voltages induced in each of the coils by a changing magnetic field are equal. When a voltage drop caused by the appearance of a normal portion of the superconductive coil occurs, a voltage appears between the sensing output terminals 40' and 42'. The amplifier 64 increases the voltage signal to operate a switching device shown as a switching SCR 66 as well as a commutationg circuit (not shown) connected to the sensing output terminals 40' and 42' in the manner of FIGURE 6.

The switching SCR 66 has an anode 68, a cathode 70 and a gate 72. The cathode 70 and the gate 72 are connected across the output of the amplifier 64. When a signal appears at the sensing output terminals 40' and 42', the switching SCR 66 is triggered on. As it is in series with the short circuiting resistance 74, the short circuit is thereby placed in series with the bifilar winding 62. Thus, upon triggering of the switching SCR 66, a closed current loop is formed with the bifilar winding which is in a mutually inductive relationship with the superconductive coil 2. An energy transfer circuit is then formed such as that shown in FIGURE 6. If the superconductive coil 2 is returned to its superconducting state and is re-energized by means of a second load SCR 44 such as shown in FIGURE 6, then it would be necessary to simultaneously commutate off the switching SCR 66 so that the switching SCR 66 will resume its blocking state and the bifilar winding 62 will resume its function as a portion of a sensing circuit. This circuit has the advantage of providing the sensitive sensing circuit, shown in FIGURE 6, while eliminating the requirement for the separate sensing winding 38 by adding the switching device 66.

Referring to FIGURE 10, the bifilar coil 38 shown in FIGURE 6 is replaced by a first sensing coil 76 and a second sensing coil 78. FIGURE 10a shows the physical construction of such a sensing coil with the first sensing coil 76 being wound about the exterior of the superconductive coil while the second sensing coil 78 is wound close to the inside layer of the superconductive coil 2. The sensing coils 76 and 78 are connected in series between the first load terminal 34 and a first input of the amplifier 64 and are wound with their winding turns interleaved with the windings of superconductive coil 2. A high resistance voltage divider 80 having a tap 82 is connected in parallel with the superconductive coil 2, and a second input terminal of the amplifier 64 is connected to the voltage divider tap 82. This tap is adjusted so that under superconducting conditions no input signal is provided for the amplifier 64 due to changing flux. When a portion of the superconductive coil 2 becomes resistive, an input signal is provided which appears at the sensing output terminals 40' and 42' to initiate de-energization of the circuit. FIGURE 10 also shows how this sensing circuit is utilized with the energy transfer circuit which comprises the temporary energy storage coil 54 and load resistor 56 as shown in FIGURE 6.

FIGURE 11 reveals a protective scheme which could be used in conjuction with a flux pump 86 of conventional construction. A similar switching arrangement to that shown in FIGURE 6 between the D.C. power supply 4 and the second load terminal 36 could be substituted between the flux pump 86 and its power supply. The sensing circuit shown is similar to that discussed with relationship to FIGURE 8 except that two amplifiers are used. A first amplifier 88 is connected to the sensing circuit and its output comprises two parallel circuits. A first output circuit is formed by an input to a second amplifier 90 which produces a signal at the sensing output terminals 40' and 42'. The amplifier 90 and the sensing output terminals 40' and 42' are optional; they can be connected to a switching means disposed between the flux pump 86 and its power supply as in the arrangement of FIGURE 6. A power cryotron 92 is disposed in series with the flux pump 86 and the superconductive coil. As known in the art, a power cryotron comprises an impedance device and a control coil. The impedance device is connected in series with the load to be switched, while its control coil is connected to an energization source. When the control coil is energized, the power cryotron exhibits a finite impedance, while deenergization of the control coil switches the power cryotron to a substantially-zero impedance superconducting condition. In this particular circuit, a control coil 94 is shown and the input terminals to the control coil 94 are connected to the second output for the first amplifier 88. The appearance of a normal portion of the superconductive coil 2 causes a signal to be applied to the input of the first amplifier 88. This amplified signal is simultaneously transmitted to energize the power cryotron 92 through its control coil 94, and is supplied to the sensing output terminals 40' and 42' to energize any switching means disposed between the flux pump 86 and its power supply. With the superconductive coil de-energized by this pulse, the energy begins to transfer to a load resistor 74 as its impedance is relatively low with respect to that of the voltage divider 80. When the superconductive coil 2 returns to the superconducting state, the signal to the first amplifier 88 disappears thereby de-energizing the power cryotron 92. If a time-delay circuit similar to that discussed in conjunction with FIGURE 6 is incorporated in the switching means disposed between the flux pump 86 and the power supply, the superconductive coil is re-energized immediately upon disappearance of the normal portion and a reversion of the power cryotron to a substantially-zero impedance.

The invention as set forth herein provides a protective circuit for a superconductive coil which is sensitive only to current decreases in a superconductive coil caused when a portion of the superconductive coil becomes normal. Each of the sensing circuits which form a part of the invention are relatively insensitive to other transient causes of current decreases in the superconductive coil. Although a current decrease caused by a portion of the superconductive winding going normal interrupts the current, a time-delay and firing circuit and a shunt switching means is provided to re-establish current at some predetermined time subsequent to the initial de-energization. The protective circuit also contemplates the use of various energy transfer circuits to temporarily store the energy in the superconductive winding for a time subsequent to the initial interruption of the current to the time when the shunt switching device re-establishes current in the superconductive winding. In this manner, the superconductive winding is de-energized only when there is serious danger to the winding caused by a portion of the winding going through a normal state and is re-energized before all the energy stored in the superconductive coil is dissipated. Additionally, means are provided for quickly reducing the current in the superconductive winding to zero to assure its fast return to a superconducting condition, and thereby minimize loss of energy.

While the present invention has been described with reference to particular circuits and embodiments thereof, various modifications may be made by those skilled in the art without actually departing from the spirit and scope of the invention. Therefore, the appended claims are intended to cover all such equivalent variations as come within the true spirit and scope of the invention.

What is claimed as new and desired to be secured by Letters Patent of the United States is:

1. A protective circuit for a superconductive load adapted to be connected to a power supply and energized thereby comprising:
   (a) a first load current switching means;
   (b) means connected to said first load current switching means to initiate conduction therethrough;
   (c) means connected to said first load current switching means to terminate conduction therethrough;
   (d) sensing means connected to said conduction termination means and to said superconductive load to actuate said conduction termination means in response to a signal developed at the inception of the transition of a portion of said superconductive load to a normal state;
   (e) a second load current switching means connected in parallel with said first load current switching means;
   (f) means connected to said second load current switching means to initiate conduction therethrough a predetermined period after conduction through said first load current switching means has terminated, said second load switching conduction initiation means being connected to and responsive to said conduction termination means; and
   (g) ancillary storage means to maintain the magnetic field and its energy during the time in which the current in the superconductive load is interrupted and superconductivity is being restored; and
   (h) energy dissipation means to dissipate the leakage energy of the superconductive load and to reduce the current in the superconductive load to identically zero value in the shortest possible time.

2. The combination set forth in claim 1 wherein said superconductive load comprises a superconductive coil and said sensing means comprises a sensing winding physically juxtaposed to said superconductive coil and having a voltage induced therein in opposition to the voltage induced in said superconductive coil, said conduction termination means having its input coupled across said superconductive coil and said sensing coil in series.

3. A protection circuit for a superconductive load adapted to be connected to a power supply and energized thereby comprising:
   (a) a first load current power semiconductor;
   (b) gating means connected to said first load current power semiconductor to initiate conduction therethrough;
   (c) commutating means connected to said first load current power semiconductor for commutating the same off and terminating conduction therethrough;
   (d) sensing means operatively connected to said commutating means and operatively coupled to said superconductive load to actuate said commutating means in response to a current decrease caused by a transition of a portion of said superconductive load to a normal state;
   (e) a second load current power semiconductor operatively connected in parallel circuit relationship with said first load current carrying power semiconductor;
   (f) gating means connected to said second load current power semiconductor to initiate conduction therethrough, a predetermined period after said first load current power semiconductor has been commutated off, said last input means being operatively coupled to and controlled by said commutating means;
   (g) ancillary storage means to maintain the magnetic field and its energy during the time in which the current in the superconductive load is interrupted and superconductivity is being restored; and
   (h) energy dissipation means to dissipate the leakage energy of the superconductive load and to reduce the current in the superconductive load to identically zero value in the shortest possible time.

4. The combination set forth in claim 3 wherein the superconductive load comprises a superconductive coil and said sensing means comprises a sensing winding bifilar wound with said superconductive coil and having a voltage induced therein in opposition to the voltage induced in said superconductive coil by the same magnetic flux which threads the superconductive coil, said commutating means having its input operatively coupled across said superconducting coil and said sensing coil in series.

5. A protective circuit for a superconductive coil adapted to be connected to a power supply and energized thereby comprising:
   (a) a first load SCR connected between said superconductive coil and the power supply;
   (b) means to gate on said first load SCR;
   (c) a communtating circuit connected to said first load SCR;
   (d) an inductive circuit connected to said commutating circuit and to said superconductive coil so as to be subjected to a magnetic field produced by current flowing through said superconductive coil, said inductive circuit being responsive to a current decrease caused by a transition of a portion of said superconductive coil to a normal state to actuate said commutating circuit;
   (e) a second load SCR and a load resistor connected in a shunt path for said first load SCR;

(f) a time-delay and gating circuit connected between said commutating circuit and said second load SCR, said time-delay and gating circuit being responsive to operation of said commutating circuit to trigger said second load SCR after a predetermined time-delay;

(g) ancillary storage means operatively coupled to said superconductive coil to maintain the magnetic field and its energy during the period during which the current in the superconductive coil is interrupted and superconductivity is being restored; and (h) energy dissipation means coupled to the superconductive coil to dissipate the leakage energy of the coil and to reduce the current in the coil to zero value in the shortest interval of time.

6. A protective circuit as set forth in claim 5 wherein said inductive circuit comprises a sensing coil having the same number of turns and bifilar wound with said superconductive coil and wherein said sensing coil is connected in series circuit relationship with said superconductive coil.

7. A protective circuit for a superconductive coil adapted to be connected to a power supply and energized thereby comprising:

(a) a first load SCR connected between said superconductive coil and the power supply;

(b) means to gate on said first load SCR;

(c) a commutating circuit connected to said first load SCR;

(d) a resistive and inductive sensing circuit connected to said commutating circuit and to said superconductive coil, a resistive portion of said resistive and inductive circuit being tapped so as to be responsive only to a current decrease caused by a transition of a portion of said superconductive coil to a normal state to to actuate said commutating circuit;

(e) a second load SCR and a limiting resistor connected in a shunt path for said first load SCR;

(f) a time-delay and gating circuit connected between said commutating circuit and said second load SCR, said time-delay and gating circuit being responsive to operation of said commutating circuit to trigger said second load SCR after a predetermined time-delay;

(g) ancillary storage means operatively coupled to said superconductive coil to maintain the magnetic field and its energy during the period during which the current in the superconductive coil is interrupted and superconductivity is being restored; and (h) energy dissipation means coupled to the superconductive coil to dissipate the leakage energy of the coil and to reduce the current in the coil to zero value in the shortest interval of time.

8. A protective circuit as set forth in claim 7 wherein an inductive portion of said resistive and inductive circuit is formed of a tapped portion of said superconductive coil.

9. A protective circuit as set forth in claim 7 wherein an inductive portion of said resistive and inductive circuit comprises two sensing coils in series, a first sensing coil being disposed adjacent inside turns of said superconductive coil and the second sensing coil being disposed about an outer portion of said superconductive coil.

10. A protective circuit for a superconductive coil adapted to be connected to a power supply and energized thereby comprising:

(a) a first load SCR connected between said superconductive coil and the power supply;

(b) means to gate on said first load SCR;

(c) a commutating circuit connected to said first load SCR;

(d) means connected to said commutating circuit and to said superconductive coil to actuate said commutating circuit in response to a current decrease caused by a transition of a portion of said superconductive coil to a normal state;

(e) a second load SCR and a limiting resistor connected in a shunt path for said first load SCR;

(f) a time-delay and gating circuit connected between said commutating circuit and said load SCR, said time-delay and firing circuit being responsive to operation of said commutating circuit to trigger said second load SCR after a predetermined time-delay; and (g) ancillary storage means operatively coupled to said superconductive coil to maintain the magnetic field and its energy during the period during which the current in the superconductive coil is interrupted and superconductivity is being restored; and (h) energy dissipation means coupled to the superconductive coil to dissipate the leakage energy of the coil and to reduce the current in the coil to zero value in the shortest interval of time.

11. A protective circuit as set forth in claim 10 wherein a switching SCR is connected in series with said energy dissipation means which comprises a resistor said switching SCR being conected to said commutating circuit actuating means so as to be responsive to a gating signal developed at the inception of the transition of a portion of said superconductive coil to a normal state thereby allowing the storage winding to be used as a sensing winding.

12. A protective circuit as set forth in claim 10 wherein a switch is connected in series with said dissipation means and is connected to said commutating circuit actuating means so as to be responsive to a gating signal developed at the inception of the transition of a portion of said superconductive coil to a normal state.

13. A protective circuit for a superconductive coil adapted to be connected to a power supply and energized thereby comprising:

(a) a flux pump connected to the power supply to provide a D.C. voltage for said superconductive coil, said flux pump having an essentially zero internal resistance;

(b) a power cryotron connected between said superconductive coil and said flux pump, said power cryotron having input terminals and having output terminals which connect said power cryotron in series with said flux pump and said superconductive coil;

(c) means connected to said power cryotron input terminals to energize said power cryotron in response to transition of a portion of said superconductive coil to a normal state, said power cryotron characterized by an infinite impedance when so energized; and (d) dissipation circuit connected in parallel with said superconductive coil, the impedance of said superconductive coil being negligible with respect to said dissipation circuit in the superconducting state and being relatively large with respect to dissipation circuit when a portion of said superconductive coil is in the normal state.

14. A sensing circuit for a superconductive coil comprising a sensing winding physically disposed adjacent said superconductive coil and inductively coupled to the magnetic field produced by current flowing through said superconductive coil, whereby voltage changes across said superconductive coil caused by variations of the magnetic field produced thereby also appears across said sensing winding, said sensing winding being electrically connected in series circuit relationship with said superconductive coil in phase opposition therewith whereby inductive voltages across the superconductive coil cancel the inductive voltages across the sensing windings and resistive voltage drops in said superconductive coil appears only across said superconductive coil.

15. The sensing circuit as set forth in claim 14 wherein said sensing winding comprises a coil having the same number of turns and bifilar wound with said superconductive coil, one set of adjacent terminals of each of said coils being connected together with the terminals of each of said coils forming output terminals for the circuit.

16. A sensing circuit for a superconductive coil comprising resistive and inductive branches having input and output terminals, a first output terminal being connected to the inductive branch of said sensing circuit, the inductive branch being operatively coupled to the superconducting coil, the resistive branch of said sensing circuit comprising a tapped resistor operatively coupled across said superconductive coil, a second output terminal being connected to the tap on said resistor, said tap being set so that no voltage appears between said output terminals during the superconducting state of said superconductive coil, whereby a voltage appears between said output terminals during the transition of a portion of said superconductive coil to a normal state.

17. A sensing circuit as set forth in claim 16 wherein said inductive branch is formed of a tapped portion of said superconductive coil, said first output terminal being connected to said tap on said superconductive coil.

18. A sensing circuit as set forth in claim 17 wherein said inductive branch comprises two coils in series, a first coil being disposed adjacent inside turns of said superconductive coil and a second coil being disposed about the outer portion of said superconductive coil, said first output terminal being connected to a first terminal of said series coils and a second terminal of said series coils being connected to one terminal of said superconductive load.

19. A circuit for dissipating energy stored in a superconductive coil when said superconductive coil is de-energized comprising: a dissipation resistor coupled to said superconductive coil to dissipate energy externally thereof and a constant voltage device including a D.C. power supply and a diode connected so that said diode opposes current flow from said D.C. power supply to thereby permit the current in said superconductive coil to be driven directly to zero when said superconductive coil is de-energized.

20. A circuit for dissipating energy stored in a superconductive coil when said superconductive coil is de-energized comprising: a dissipation resistor, an ancillary storage coil inductively coupled to the superconductive coil and a switch, said dissipation resistor, said dissipation coil and said switch being disposed in series, and means connected to said switch to close said switch when said superconductive coil is de-energized.

References Cited by the Examiner
UNITED STATES PATENTS 3,270,247   8/1926   Rosner _____ 317—13

OTHER REFERENCES

IBM Technical Disclosure Bulletin, "Energy Removal From a Superconducting Solenoid," vol. 6, No. 9, February 1964, p. 67.

References Cited by the Applicant

Field Energy Removal From a Superconducting Solenoid, M. W. Dowley, Cryogenics, June 1964.

Protection of Superconducting Coils, P. F. Smith, Rev. Sci. Instru., vol 34, April 1963, p. 368.

Silicon Controlled Rectifier Manual prepared by the Rectifier Component Dept., Auburn, N. Y., 3rd edition, 1964.

MILTON O. HIRSHFIELD, *Primary Examiner.*

J. D. TRAMMELL, *Assistant Examiner.*